United States Patent [19]
Holstein et al.

[11] Patent Number: 5,865,569
[45] Date of Patent: Feb. 2, 1999

[54] INTERNAL BROACH FOR THE INTERNAL BROACHING OF PROFILES

[75] Inventors: Herbert Holstein; Reinhard Melcher, both of Solingen, Germany

[73] Assignee: Oswald Forst Maschinenfabrik und Apparatebauanstalt GmbH & Co Kommanditgesellschaft, Solingen, Germany

[21] Appl. No.: 743,835

[22] Filed: Nov. 5, 1996

[51] Int. Cl.[6] .................................................. B23D 43/00
[52] U.S. Cl. ................................ 407/13; 407/18; 407/19
[58] Field of Search ............................ 407/13, 18, 19; 409/259, 260, 261

[56] References Cited

U.S. PATENT DOCUMENTS 2,683,919  7/1954  Psenka .
2,898,670  8/1959  Pernack ........................................ 407/18
2,986,801  6/1961  Mentley ..................................... 407/18 X
3,217,383  11/1965  Psenka ....................................... 407/18
3,231,962  2/1966  Psenka ....................................... 407/18
3,795,958  3/1974  Psenka ....................................... 407/19

OTHER PUBLICATIONS

DIN 1415, Bl. 01 Sep. 1973, Presgr. 11.

*Primary Examiner*—Andrea L. Pitts
*Assistant Examiner*—Henry W. H. Tsai
*Attorney, Agent, or Firm*—Browdy and Neimark

[57] ABSTRACT

An internal broach for the broaching of profiles defined by a bottom and flanks, in particular of internal toothings, in a workpiece is provided with broach cutting teeth which have bottom-cutting edges and flank-cutting edges. Over their full profile height, the flank-cutting edges of broach cutting teeth disposed one after the other and allocated to each other have an ascending profile in the range of 1 $\mu$m to 3 $\mu$m.

5 Claims, 2 Drawing Sheets

INTERNAL BROACH FOR THE INTERNAL BROACHING OF PROFILES

BACKGROUND OF THE INVENTION

1. Field of The Invention

The invention relates to an internal broach for the internal broaching of profiles defined by a profile bottom and flanks, in particular of internal toothings, in a workpiece.

2. Background Art

The internal broaches conventionally used for the internal broaching of profiles are known from DIN 1415 (edition 1973), sheet 1, page 2. They comprise a shank, a toothed portion and an end portion. The shank is held by a puller of a broaching machine, which pulls the broach through a workpiece held in the broaching machine, thereby broaching the profiles. After the broaching operation, the end portion is seized by an end-portion holder of the broaching machine, which returns the broach to its initial position after the broaching operation. The toothed portion exhibits several rows of broach cutting teeth one after the other counter to the direction of broaching, as a rule a great number of broach cutting teeth. The broach cutting teeth comprise bottom-cutting edges for the machining of the bottom of a profile and flank-cutting edges for the machining of the flanks of the profile. The broach cutting teeth, which serve to cut a profile and are disposed one after the other counter to the direction of broaching, and which, in this regard, are allocated to each other, exhibit a depth stepping, i.e. ascending diameters, so that all the broach cutting teeth serving to machine a profile one after the other cut a chip serving to produce the bottom of the profile. Since the bottom-cutting edges deliver the main machining performance, they are also called main cutting edges. As far as the cutting of the flanks of the profile is concerned, the broach cutting teeth disposed one after the other counter to the direction of broaching exhibit flank-cutting edges that have a back taper as illustrated in DIN 1415 (edition 1973), sheet 1, page 3, picture 11. The flank-cutting edges are also called secondary edges. The back taper is produced in that, referred to the flank-cutting edges of a leading broach cutting tooth, the flank-cutting edges of a subsequent broach cutting tooth are provided with a lateral relief so that the flank-cutting edges of the subsequent broach cutting tooth only machine in the area provided by the ascending diameters or depth stepping, while not coming into engagement with the workpiece in the area where the flank-cutting edges of the leading broach cutting tooth have cut. This helps prevent any jamming of the broch cutting teeth in the vicinity of the flanks during the broaching operation. As a result, the flanks of the profile get a stepped surface structure.

The profiles produced by the known and conventional internal broaches have a surface quality and accuracy of profile shape and contour sufficient for normal applications and requirements. During the broaching operation, displacement of the axis of the broach may occur so that the broach cutting teeth that come into engagement one after the other each have a different central position relative to the workpiece to be broached. In particular during twist broaching (helical broaching), a torsion defect produced by rotatory forces during twist broaching may be superposed on such a displacement of the axis of the broach. Very often the accuracy of profile shape and the surface quality of the profile flanks are not sufficient, although the accuracy of flank contour will be satisfying as a rule. High accuracy of profile shape and contour is demanded in particular in the case of running gears, for instance internally toothed gears with spur or helical toothing.

In order to eliminate the deficiencies specified and to comply with correspondingly high requirements, it is known to provide the broach with a sizing portion subsequent to the back-tapered broach cutting teeth—referred to the direction of broaching. Such a sizing portion consists of several broach cutting teeth disposed one after the other, which are of identical height, not shaving the bottom of the profile. However, they have tooth thicknesses that increase counter to the direction of broaching, i.e. over the full height of the flank of the profile, all the sizing teeth cut a chip, the thickness of which generally amounts to 10 to 20 $\mu$m. Each flank-cutting edge of the sizing teeth must be provided with a relief produced by grinding, i.e. a relief angle. Excellent accuracy of shape of the profile and high surface quality is obtained by sizing. As regards the accuracy of contour of the flanks, there is some deterioration as compared with the profile broached by depth stepping. This results from the fact that the relief-ground flank-cutting edges of the sizing teeth are sharp cutting edges, the self-guidance behavior of which is comparatively bad.

It is inherent in the system that the changeover from depth-stepped broaching to full-shape sizing is accompanied with an interruption of the broaching force that leads to considerable disadvantages in particular in the case of twist-broaching. Relieving the main cutting force that works counter to the direction of broaching will also lead to a reduction in torsional tension, i.e. the relative torsion between the workpiece and the internal broach changes. This change can be so strong that the full-shape-sizing edge does not correctly enter the profiles broached by depth stepping, as a result of which machining the flanks unilaterally so that the profile is not sized on both flanks. Owing to the deficiencies specified of the profile produced by depth-stepped broaching, the flank-cutting edges of the sizing teeth irregularly cut into the stepped flanks of the profile, this again generating torsional vibrations which negatively affect the accuracy of contour of the profile.

SUMMARY OF THE INVENTION

It is the object of the invention to embody an internal broach that ensures high surface quality, accuracy of shape and contour of the profiles to be broached.

According to the invention, this object is solved by the features consisting in that the internal broach comprises a shank and a toothed portion, the shank leading in the direction of broaching; in that the toothed portion is provided with several rows of broach cutting teeth disposed one after the other counter to the direction of broaching, broach cutting teeth that are disposed one after the other being allocated to each other for the broaching of a profile; in that the broach cutting teeth have bottom-cutting edges and flank-cutting edges, the flank-cutting edges passing through the bottom-cutting edges in cutting-edge corners; in that the bottom-cutting edges of broach cutting teeth disposed one after the other and allocated to each other have an ascending diameter with respect to the broach cutting teeth leading in the direction of broaching; in that the bottom-cutting edges have a relief; and in that over their full profile height, the flank-cutting edges of broach cutting teeth disposed one after the other and allocated to each other have an ascending profile, which is minor referred to the ascending diameter of the bottom-cutting edges. With the internal broach according to the invention, the main machining performance is delivered by the depth stepping of the broach cutting teeth, i.e. by the main cutting edges, namely the bottom-cutting edges. Unlike the prior art, the flank-cutting edges exhibit an ascending profile instead of a back taper. This means that every broach cutting tooth is slightly thicker than the next leading broach cutting tooth. The ascending profile is chosen such that every broach cutting tooth can compensate any distorsions that may originate from the leading broach cutting tooth. The chip thicknesses are considerably smaller than those produced during full shape sizing. The flank-cutting edges only proceed with shaving the broached entire flank. Good self-guidance of the broach-cutting teeth on the flanks of the profile to be broached occurs, resulting from the reduced thickness of the chips shaved by the flank-cutting edges.

The good self-guiding behavior of the broach ensures high accuracy of contour of the flanks. A good profile shape is obtained in that any defects caused by displacement of the axis of the broach are immediately compensated by the following teeth. Good surface properties of the broached flanks are obtained by the entire flanks produced being shaved subsequently. Any broaching-force interruptions and the ensuing disadvantages do no occur with the internal broaches according to the invention. With the internal broach according to the invention, the entire broaching stroke is characterized by continuity of forces in the direction of the main cutting force as well as in the direction of the tensile force, i.e. also in the torsional direction.

The dimensional ranges for the ascending profile are i <5μm and 1μm <i <μm, this ascent causally contributing to the fact that the flankcutting edges primarily have a shaving effect. Because of this shaving effect, the flank-cutting edges may be provided with a relief produced by grinding without the self-guiding properties of the broach-cutting teeth being affected.

In the case of surface broaching of so-called pine-tree profiles in turbine rotors, first broaching conventionally takes place by external broaches with depth stepping of the broach cutting teeth, which is followed by sizing by means of full-shape cutting broaches. Linearity distortions and problems of guidance do not occur, since the broaches are rigidly guided on the slide of the external broaching machine. Some turbine materials do not allow full-shape sizing out of reasons of machining technique. In order for linearity distortions to be compensated during the manufacture of the external broaches and during clamping of the external broaches on the broaching-machine slide, external broaches are used, having depth-stepped broach cutting teeth of extremely little ascent of profile. The broach cutting teeth are full-shape relief-ground. This does not aim at improving the self-guiding behavior while simultaneously compensating any displacement of the central axis of the broach as in the case of the internal broaches which are not externally guided in the area of contact between the broach and the workpiece.

Details of the invention will become apparent from the ensuing drawing.

DESCRIPTION OF THE PREFERRED EMBODIMENT

Figure 1:
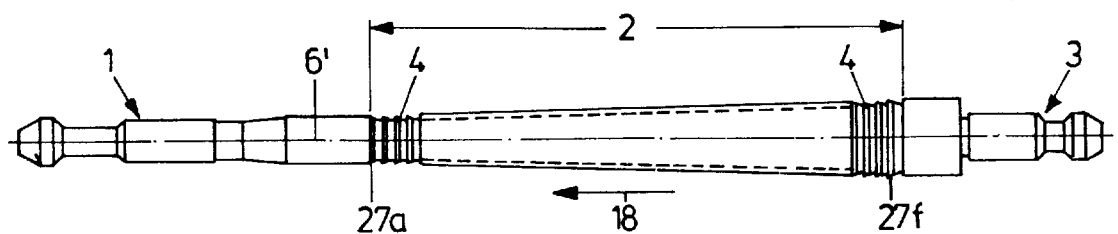
FIG. 1 is an illustration of an internal broach.
Figure 2:
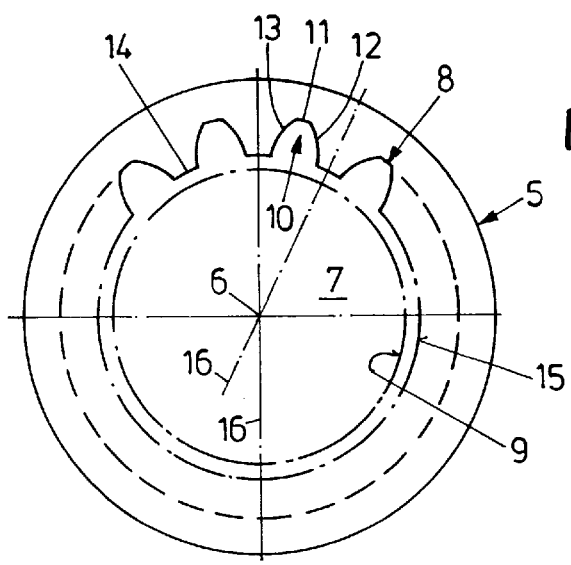
FIG. 2 is an illustration of a workpiece provided with profiles in the form of an internal toothing.

The internal broach of known design seen in FIG. 1 comprises a shank 1, a toothed portion 2, which is followed by an end portion 3. Numerous rows 4 of broach cutting teeth are disposed on the toothed portion 2. The internal broach serves to machine for instance an annular workpiece 5. Even prior to broaching, the latter has a drilled hole 7 concentric of the central longitudinal axis 6 of the finished workpiece 5. The workpiece 5 is placed on a workpiece support of an internal broaching machine; then the shank 1 of the broach is passed through the drilled hole 7 and seized by a shank holder, which is drivable in the direction of the axis 6' of the broach and pulls the broach through the workpiece 5. During this operation, profiles 8, for instance an internal toothing, are broached into the inside circumference of the workpiece 5. The internal broach is not positively guided, self-guidance or self-centering, respectively, between the workpiece and the broach occurring. The end portion 3 primarily selves for the return of the internal broach after a broaching stroke.

The profiles 10 to be broached have a bottom 11, two flanks 12, 13 opposite to each other and a web 14, which joins to each other the adjacent flanks 12, 13 of two adjacent profiles 10. The flanks 12, 13 of a profile 10 and the bottom 11 form a corner. During the broaching of the profiles 8, the drilled hole 7 is widened to form a recess 15 defined by the webs 14. The broaching of the workpiece 5 in the vicinity of the webs 14 to be produced will not be explained in the following, since it is of no importance for the understanding of the invention. The following is a description of the broaching of a profile 8 by broach cutting teeth of varying design, the profile 8 being disposed between two radiuses 16 through the axis 6 which cut in two webs 14 adjoining the profile 8.

Figure 3:
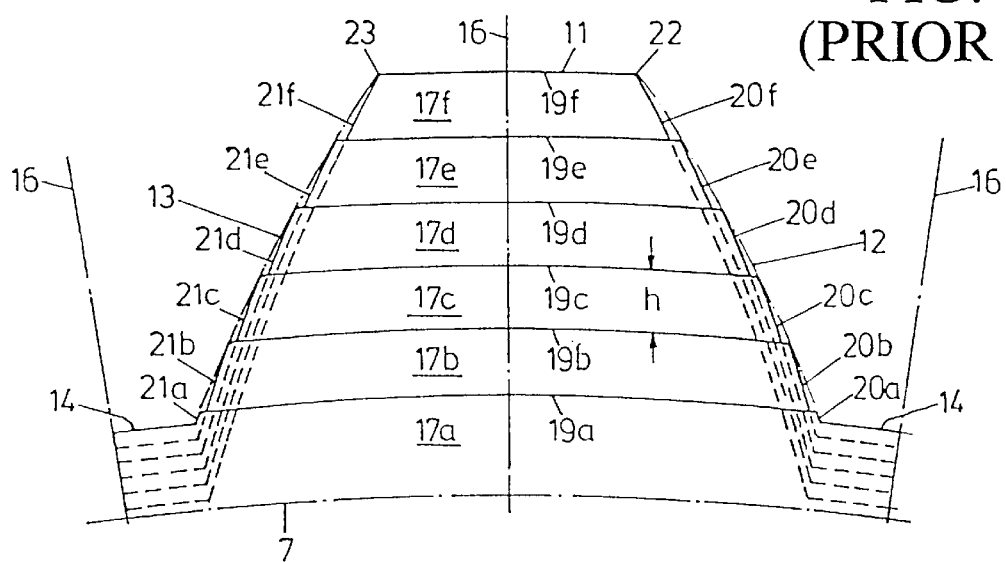
FIG. 3 is an illustration of the broaching by depth stepping of a prior art profile.

When embodied according to DIN 1415 (edition 1973), the internal broach has broach cutting teeth i.e. 17a–f, of which the first broach cutting tooth to come into engagement is designated by 17a, further broach cutting teeth by 17b, 17c, 17d, 17e and the last broach cutting tooth to come into engagement by 17f. Even if only six broach cutting teeth are shown, practical broaches have five to twenty times the number of broach cutting teeth, depending on the depth of the profile to be produced. The broach cutting teeth 17a to 17f are disposed on the broach counter to the direction of broaching 18. The broach cutting teeth 17a to 17f each have a bottom-cutting edge 19a to 19f taking a course that corresponds to a circle concentrical of the axis 6', it being mentioned for completion that fundamentally, the axis 6' of the broach and the axis 6 of the workpiece 5 are to coincide. The bottom-cutting edges 19a to 19f are conventionally provided with a relief produced by grinding, i.e. a relief angle. Furtheron, the broach cutting teeth 17a to 17f are provided with flank-cutting edges 20a to 20f and 21a to 21f, respectively. While the bottom-cutting edges 19a to 19f are main cutting edges, the flank-cutting edges 20a to 20f and 21a to 21f, respectively, are so-called secondary cutting edges. The flank-cutting edges 20a to 20f and 21a to 21f and the bottom-cutting edges 19a to 19f intersect in cutting-edge corners 22 and 23, respectively. Only these cutting-edge corers 22 and 23 lie on the desired flank 12 and 13, respectively, of the profile 10 outlined by dashes in FIG. 3. The flank-cutting edges 20a to 20f and 21a to 21f have a back taper, i.e. they lie free towards the desired profile flanks 12, 13 actually to be produced. The flank-cutting edges 20a to 20f and 21a to 21f, respectively, cut a chip only in the portion where the bottom-cutting edge 19b to 19f, referred to a directly leading bottom-cutting edge 19a to 19e, comes into engagement with the workpiece 5. In other words, it only cuts in the portion predetermined by the diameter ascent h of the bottom-cutting edges 19a to 19f. As seen in FIG. 3, instead of the desired flanks 12, 13, profile flanks are produced, having a stepped course as illustrated by the course of the flank-cutting edges 20a t 20f and 21a to 21f in FIG. 3.

Figure 4:
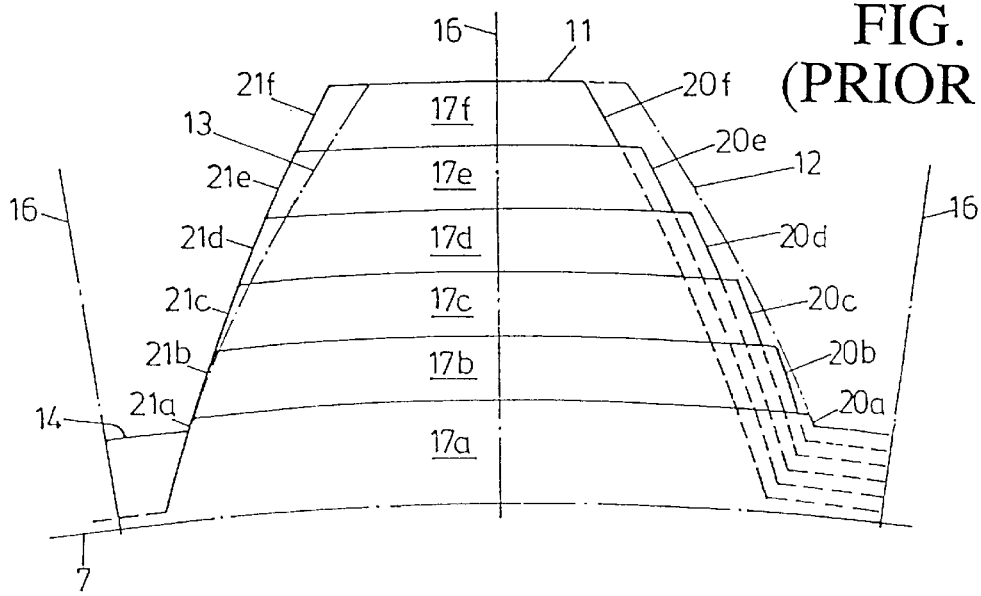
FIG. 4 is an illustration of profile defects occurring during the broaching according to FIG. 3.
Figure 5:
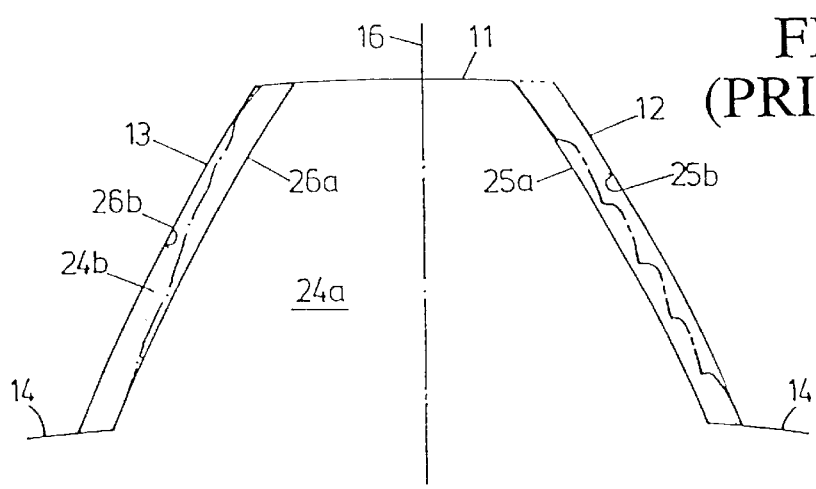
FIG. 5 is an illustration of the operation of flank-sizing of a profile having a profile defect according to FIG. 4.

During this known broaching characterized by depth stepping and back taper, further profile defects seen in FIG. 4 can occur by the internal broach drifting off. In this case, the central longitudinal axis 6' of the internal broach is continuously displaced relative to the central longitudinal axis 6 of the workpiece 5 during the broaching operation. The axes 6' and 6 move apart during the broaching operation. In FIG. 4, the profile actually produced is illustrated by the course taken by the flank-cutting edges 20a to 20f and 21a to 21f and the bottom-cutting edge 19f of the last broach cutting tooth 17f. FIG. 4 also shows the deviation of this actually produced profile from the desired course of the flanks 12 and 13 outlined by dashes. FIG. 5 illustrates how the profile broached according to FIGS. 3 and 4 is sized in the vicinity of the flanks. Of the rear sizing teeth 24 referred to the direction of broaching 18, only two sizing teeth are shown, namely the first sizing tooth 24a and the last sizing tooth 24b. The sizing teeth 24a and 24b only have flank-cutting edges 25a, 25b and 26a, 26b and sizing edges—not relevant in this context—for the profile webs 14. The bottom 11 is not broached by the sizing teeth 24a, 24b. If the flanks actually broached have the course seen in FIG. 3, then the flanks are subsequently broached by means of the flank-cutting edges 25a, 25b and 26a, 26b until the last flank-cutting edges 25b and 26b produce the desired flanks 12, 13.

If, however, the flanks actually broached have the course illustrated in FIG. 4, which is roughly outlined by a dot-dashed line in FIG. 5, considerable difficulties will result in the sizing, because, conditioned by the profile broached asymmetrically, the flank-cutting edges 25a, 25b and 26a, 26b have to cut considerably more material off the workpiece 5 than in the case of the symmetrically broached profile according to FIG. 3.

Figure 6:
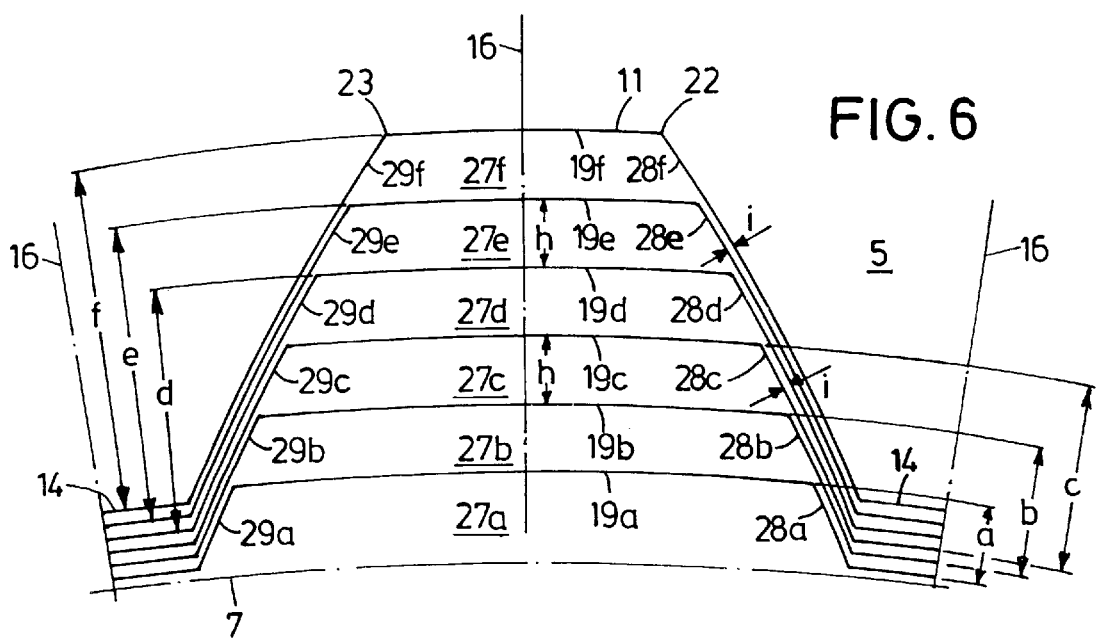
FIG. 6 is an illustration of the internal broaching of a profile by an internal broach according to the invention.

In the embodiment according to the invention illustrated in FIG. 6, the toothed portion 2 of the broach of FIG. 1 comprises broach cutting teeth 27a to 27f for broaching each profile 8 in the workpiece 5, it being true in this case too that the actual number of rows 4 of broach cutting teeth 27 is five to twenty time greater, depending on the profile depth to be produced. In the same way as the broach cutting teeth according to FIGS. 3 and 4, the broach cutting teeth 27a to 27f have bottom-cutting edges 19a to 19f, which produce the profile bottom 11 in the same way as with the known embodiment. They likewise have a diameter ascent h and a relief angle. As opposed to this, over their full profile height a to f measured radially to the axis 6, the flank-cutting edges 28b to 28f and 29b to 29f have an ascending profile i relative to the in each case preceding flank-cutting edge 28a to 28e and 29a to 29e so that the flank-cutting edges 28a to 28f and 29a to 29f each cut over their full length. i<5µm, and in particular 1µm<i<3µm, applies to the ascending profile i. As a result of these dimensions, the chips cut by the flank-cutting edges 28a to 28f and 29a to 29f, respectively, are so thin that virtually, there is only shaving taking place. The value conventionally applying to the ascending diameter h is 0.03 mm<h<0.1 mm. The profile flanks regularly exhibit a relief produced by grinding, i.e. a relief angle, without the self-guiding behavior being affected. They likewise pass through the bottom-cutting edges 19a to 19f in cutting-edge corners 22, 23. The ascending profile i and/or the diameter ascent h may vary from broach cutting tooth to broach cutting tooth over the length of the broach.

What is claimed is:

1. An internal broach for the internal broaching of internal toothings defined by the bottom (11) and flanks (12, 13) in a workpiece (5), comprising the following features:

The internal broach comprises a shank (1), an axis (6), and a toothed portion (2), the shank (1) leading in a direction of broaching (18);

the toothed portion (2) is provided with several rows (4) of broach cutting teeth (27a to 27f) disposed one after the other counter to the direction of broach, broach cutting teeth (27a to 27f) that are disposed one after the other being allocated to each other for the broaching of a profile (8), the broach cutting teeth (27a to 27f) have bottom-cutting edges (19a to 19f) and flank-cutting edges (28a to 28f; 29a to 29f), the flank-cutting edges (28a to 28f; 29a to 29f) passing through the bottom-cuttings edges (19a to 19f) in cutting-edge corners (22,23);

the bottom-cutting edges (19b to 19f) of broach cutting teeth (27b to 27f) disposed one after the other and allocated to each other have diameter ascent with respect to the broach cutting teeth (27a to 27e) leading in the direction of broaching (18), which diameter ascent h is greater than zero;

the bottom-cutting edges (19a to 19f) have a relief; and over their full profile height a, b, c, d, e, f, the flank-cutting edges (28a to 28f; 19a to 29f) of broach cutting teeth (27a to 27f) disposed one after the other and allocated to each other have an ascending profile which is greater than zero and smaller in comparison to the diameter ascent of the bottom-cutting edges (19a to 19f).

2. An internal broach according to claim 1, wherein the ascending profile is less than 5 µm.

3. An internal broach according to claim 2, wherein the ascending profile is greater than 1 µm and less than 3 µm.

4. An internal broach according to claim 1, wherein the flank-cutting edges (28a to 28f; 29a to 29f) are provided with a relief.

5. An internal broach according to claim 1, wherein at least one of the diameter ascent and the ascending profile vary from broach cutting tooth to broach cutting tooth over the length of the broach.

* * * * *